United States Patent [19]

Herrington

[11] 4,413,318

[45] Nov. 1, 1983

[54] USE OF NODES TO UNIQUELY IDENTIFY PROCESSES

[75] Inventor: Kenneth M. Herrington, Austin, Tex.

[73] Assignee: International Business Machines Corporation, Armonk, N.Y.

[21] Appl. No.: 208,622

[22] Filed: Nov. 20, 1980

[51] Int. Cl.³ .............................................. G06F 9/06
[52] U.S. Cl. .................................................. 364/200
[58] Field of Search ... 364/200 MS File, 900 MS File

[56] References Cited

U.S. PATENT DOCUMENTS

| Re. 26,171 | 3/1967 | Falkoff | 364/200 |
| 4,104,718 | 8/1978 | Poublan et al. | 364/200 |
| 4,118,771 | 10/1978 | Pomella et al. | 364/200 X |

Primary Examiner—Thomas M. Heckler

Attorney, Agent, or Firm—Richards, Harris & Medlock

[57] ABSTRACT

A method for providing a node address uniquely identifies a process to be separately addressed and dispatched in a uniprocessor or multiprocessor environment. A single processor (14) identified by a unique primary node may include a single node of multiple processes (50), multiple subnodes of processes which do not replicate all of the processes in the subnode, or multiple subnodes with multiple processes replicated in each of said subnodes. Multiple processors (14), (64) and (66) may be joined by a communication data buss (60) to form a network of processors in which any processor may assign a work request to a process in its own or any other processor of the network to efficiently schedule work requests queued to any process in the network of processors.

6 Claims, 7 Drawing Figures

NODE ADDRESS TABLE (NAT)

FIG. 6 — NODE ADDRESS TABLE (NAT)

FIG. 7 — PROCESS ADDRESS TABLE (PAT) FORMAT

USE OF NODES TO UNIQUELY IDENTIFY PROCESSES

BACKGROUND OF THE INVENTION

1. Field of the Invention

This invention relates to a method for identifying a process of an electronic digital signal processor. In particular, it pertains to the use of nodes to construct a nodal address to uniquely identify a process when more than one copy of the process exists in the system.

2. Description of Prior Art

Electronic digital signal processing systems have been developed for the processing of work requests in a real time environment. These systems have utilized an operating system in which a process was created and deleted for each work request. Such electronic digital signal processing systems require additional time and added memory size requirements.

An electronic digital signal processing system for processing work requests has been developed with an improved work request scheduling system resulting in an improved response time and smaller memory size requirements. The improved scheduling mechanism has been designed which separates the process from the routines that execute the individual work requests. The process in such a system becomes a dispatchable entity and operates to execute work requests assigned to a queue associated with each process. A need has arisen for a method to uniquely identify a process within such a system, particularly when at least one of said processes may be replicated within the system. A further need has arisen to more efficiently allocate the execution of work requests by processes in multiprocessor systems linked together by a data buss.

SUMMARY OF THE INVENTION

The present invention provides a method for identifying a process in a unique manner when more than one copy of the process exists in an electronic digital signal processing system such that the identified process may be moved within the system or to another system without code modification.

A process is defined to be a functional unit consisting of a predefined stack, a process control block, and a predefined sequence of instructions to be operated in response to a work request queued to that process in an electronic digital signal processing system. The process is assigned a unique identification code, called a Process ID (PID). The process functions as a dispatchable entity in an electronic digital signal processing system for the execution of a predefined sequence of instructions for a work request assigned to the process.

One or more processes are logically grouped together to define a node. The nodes provide a means for identifying the processes within a unique node address. Each node address consists of a primary node identifying an electronic digital signal processor and a subnode or subnodes identifying a process or logical grouping of processes within that processor's system. A nodal address comprises the combination of the node ID for a processor and a process within a processor with the Process ID (PID) to uniquely identify any process in that environment. This combination of the node ID and PID allows development programmers to design and implement software routines to communicate with the various processes in other systems central processors, using the same software interfaces as they would to communicate with processes in the same central processor.

BRIEF DESCRIPTION OF THE DRAWINGS

For a more complete understanding of the present invention and further advantages thereof, reference is now made to the following description taken in conjunction with the following drawings:

FIG. 6 is an example of a node address table format for a central processor; and FIG. 7 is an example of a process address table format for a plurality of processes within a processor.

DESCRIPTION OF THE PREFERRED EMBODIMENT

Figure 1:
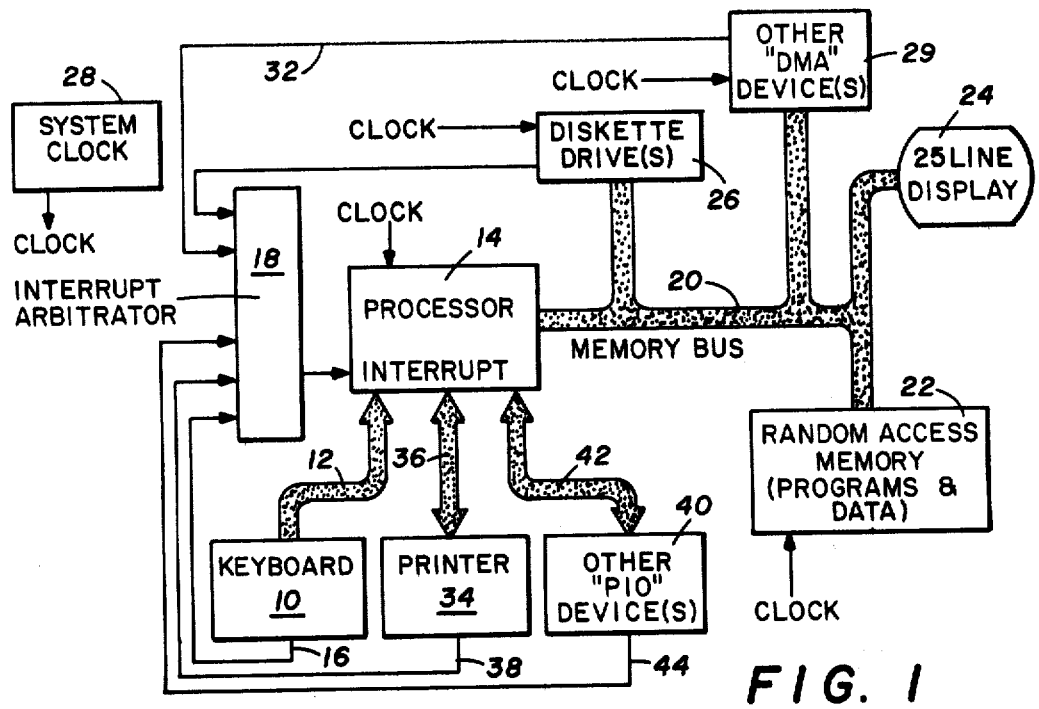
FIG. 1 is a block diagram of a word processing system for implementing the present invention.

Referring now to FIG. 1, a block diagram of a word processing system implementing the present invention as illustrated. A keyboard 10 is provided for inputting graphic characters, data, and instructions to the word processing system. The keyboard 10 applies its input to the system through a data buss 12 to a central processor 14 of the system. A processor 14 may be implemented by a commercially available microprocessor, such as the Intel 8086 processor.

The keyboard 10 also applies a hardware interrupt signal via interrupt line 16 to an interrupt arbitrator 18. The 8259-A Interrupt Controller was selected to implement the interrupt arbitrator 18 to resolve interrupt requests from the incoming interrupt lines of the system. The 8259-A Interrupt Controller may resolve interrupt requests from up to eight interrupt lines into eight priority levels for the processor 14.

The processor 14 forms the various control functions necessary for the word processing system to process, edit and display data. The processor 14 is connected by a memory buss 20 to a random access memory 22 for storing system data and programs. A visual display 24 is also connected by the memory buss to the processor 14 for displaying data and information for enabling communication between the word processing system and its operator. A diskette drive 26 driven by the system clock 28 is also connected through the memory buss to the processor 14. The diskette drives 26 comprise means for accessing the system programs loaded from a program library onto the diskettes. Modules from a program library may either be loaded or deleted from the diskettes. The word processing system may also include other "DMA" devices 29 connected by the memory buss 20 to the processor 14. The diskette drives 26 and other DMA devices 29 provide hardware interrupts signals on interrupt lines 30 and 32, respectively, to the input arbitrator 18.

A printer 34 communicates via a data buss 36 with processor 14 for providing a printed record of data or other information under the control of the processor 14.

The printer 34 also provides a hardware interrupt signal via interrupt signal line 38 to the arbitrator 18. Other processor input/output devices 40 may, of course, be provided as part of a word processing system. The processor input/output devices 40 may communicate via a data buss 42 to the processor 14, and they provide a hardware interrupt signal by interrupt signal line 44 to the arbitrator 18.

Figure 2:
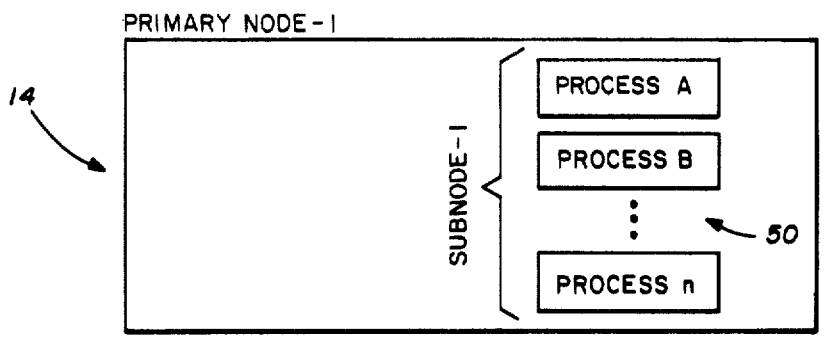
FIG. 2 is a block diagram of a system with a single processor and a plurality of processes defined within a single subnode.

Referring to FIG. 2, a plurality of processes 50 are logically grouped together to define a subnode, SUBNODE-1. SUBNODE-1 may be part of a basic system as illustrated in FIG. 1, where only one primary node, PRIMARY NODE-1, may be defined for a processor 14. In the basic system of FIG. 1, all the processes 50 execute in one processor 14 (PRIMARY NODE-1), and thus can be uniquely identified simply by its PID.

Figure 3:
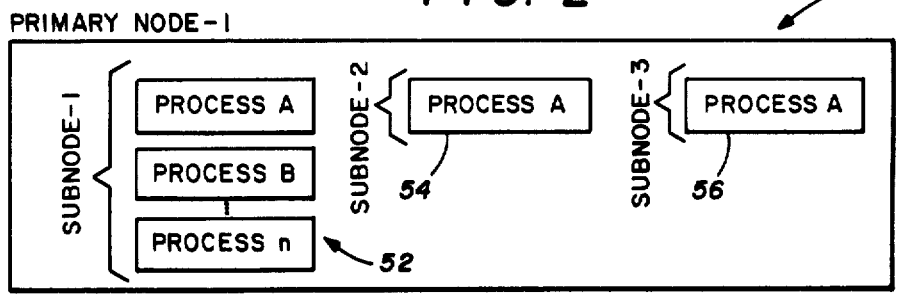
FIG. 3 is a block diagram of a single processor with a plurality subnodes.

Referring to FIG. 3, the system has only the single processor 14 identified as PRIMARY NODE-1, and it includes a plurality of processes 52 logically grouped together to define SUBNODE-1. Process A of SUBNODE-1 is further copied in the system as process 54 and process 56, and these replicated processes are grouped to define SUBNODE-2 and SUBNODE-3, respectively. In this single processor system, the replication of Process A in SUBNODE-1, SUBNODE-2 and SUBNODE-3 may be representative of a print process which is available for each printer in the system though the Process A for performing the work request for printing is identical. In this system environment, each printer would be considered as a separate subnode within the PRIMARY NODE-1. In this way the processor can address each unique process associated with its printer by use of the subnode address and PID.

Figure 4:
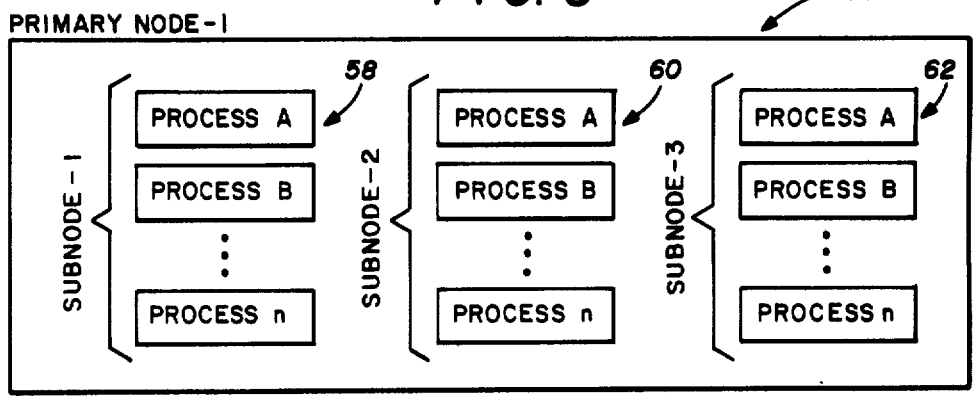
FIG. 4 is a block diagram of a single processor with a plurality of processes defined within a plurality of subnodes.

Referring to a FIG. 4, an electronic digital system environment is presented where a plurality of work stations are supported in the system by a single processor 14, identified as PRIMARY NODE-1. Each of the three work stations in the system include the same set of the plurality of processes 58, 60 and 62. The processes 58, 60 and 62 replicated in this system are logically grouped together and identified as SUBNODE-1, SUBNODE-2, SUBNODE-3, respectively. The system presented in FIG. 4 represents a modification of the basic system illustrated in FIG. 1, wherein the single processor 14 is responsible for controlling not one but three separate work stations.

Figure 5:
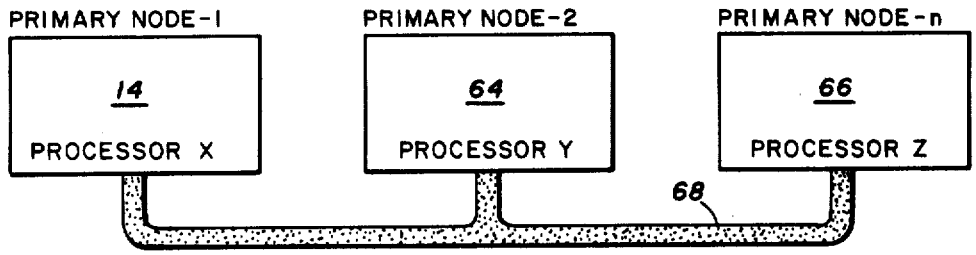
FIG. 5 is a block diagram of a multiprocessor environment.

Referring to FIG. 5, a multiple processor environment is presented in which system processors 14, 64 and 66 may communicate with one another through a common buss 68. The processors 14, 64 and 66 may be uniquely identified by their primary node IDs: PRIMARY NODE-1, PRIMARY NODE-2 and PRIMARY NODE-N. Of course, each of the primary nodes illustrated in FIG. 5 may include any number of processes logically grouped together as subnodes, as illustrated in FIGS. 2, 3 and 4.

Referring to FIG. 6, a Node Address Table (NAT) 70 is illustrated for a processor, such as processor 14 of FIG. 1. The NAT 70 defines the primary node ID 72 for the processor and contains an entry 74 indicating the number of subnodes within the primary node. Each of the subnodes is identified by an entry 76 containing the address of a Process Address Table (PAT) and a Lock Control Block (LCB) for each of the subnodes.

FIG. 7 illustrates a Process Address Table (PAT) 80 and includes an entry 82 indicating the number of entries representing the number of processes. Each entry in 84 in the PAT 80 contains the address of a Process Control Block (PCB) for a process that is executing under that subnode, or a zero if a process is not loaded under that subnode. The node-process relationship will permit two or more instances of a process to be executed simultaneously, each in a different subnode.

In operation, this node-process identification combination uniquely identifies a process in any system environment. A systems development programmer may utilize this nodal address to design and implement a software routine to communicate with any of the various processes in processors of other systems. Development programmers may use the same software interfaces between compatible systems with the combined node ID-process ID address in the same manner they would use these interfaces to communicate with processes within the same processor.

In order to schedule a work request, such as printing, the word processing system would specify the process, e.g., Process A, to effect the printing of a document. The work request instruction could identify the node ID selection which would identify which processor in a multiprocessor environment is to be assigned the task, and the subnode ID could further identify the subnode. The process ID could also be provided to identify the print process, Process A, in a selected subnode to cause the printing of the document.

What is claimed is:

1. A method for uniquely identifying processes in an electronic digital signal processing system used to accomplish tasks in response to work requests, wherein a process comprises a predefined stack, a process control block and a predefined sequence of instructions, comprising the steps of:

storing a process identification code for each of said processes in a memory means associated with said system;

storing one or more subnode addresses in said memory means, each subnode address corresponding to a predetermined grouping of one or more of said processes, wherein at least one of said grouping includes a plurality of processes;

storing a primary node address in said memory means for a processor for identifying that processor, and providing a work request to select a subnode address and a process identification code to identify a process to be used by said processor to accomplish a task.

2. The method of claim 1 for uniquely identifying a process, and further comprising:

storing a primary node address for a second processor associated with the electronic digital signal processing system, said work request further including a primary node address for identifying one of said processors.

3. The method of claim 2 for uniquely identifying a process, wherein, said process identification codes for each grouping are stored in a process address table format including the number of process codes entered and an address of a process control block for each process executing under that grouping, and said subnode addresses associated with each processor are stored in a node address table having a primary node address, the number of groupings within the primary node and the address for each process address table for each grouping.

4. A method for accomplishing tasks using an electronic digital signal processing system having one or more processors wherein processes are used to implement the tasks in response to work requests, wherein a process comprises a predefined stack, a process control block and a predefined sequence of instructions, comprising the steps of:

storing a primary node address for one or more of said processors in a memory means associated with said processing system, each primary node address corresponding to a processor;

storing one or more subnode addresses for each processor in said memory means, each subnode address corresponding to a predetermined grouping of one or more of said processes, wherein at least one of said grouping includes a plurality of processes;

storing a process identification code for each of said processes in said memory means; and providing a work request to select a processor, a subnode address, and a process identification code to identify a process to be used to accomplish a task.

5. The method for accomplishing tasks as defined in claim 4 further including the step of performing said process to accomplish said task.

6. The method for accomplishing tasks as described in claim 4, wherein, said process identification codes for each grouping are stored in a process address table format that includes an indication of the number of process codes entered and an address of a process control block for each process executing under that grouping, and said subnode addresses associated with each processor are stored in a node address table having a primary node address, the number of groupings within the primary node and the address for each process address table for each grouping.

* * * * *